US006190543B1

(12) United States Patent
Christiansen

(10) Patent No.: US 6,190,543 B1
(45) Date of Patent: Feb. 20, 2001

(54) CYCLONIC SEPARATOR

(75) Inventor: Bjørn Christiansen, Tiller (NO)

(73) Assignee: Kvaerner Process Systems A.S., Billingstad (NO)

( * ) Notice: Under 35 U.S.C. 154(b), the term of this patent shall be extended for 0 days.

(21) Appl. No.: 09/202,053

(22) PCT Filed: Jun. 4, 1997

(86) PCT No.: PCT/IB97/00777

§ 371 Date: Apr. 19, 1999

§ 102(e) Date: Apr. 19, 1999

(87) PCT Pub. No.: WO97/46323

PCT Pub. Date: Dec. 11, 1997

(30) Foreign Application Priority Data

Jun. 5, 1996 (GB) .................................................. 9611692

(51) Int. Cl.[7] .......................... B01D 17/038; B01D 21/26

(52) U.S. Cl. .......................... 210/87; 210/97; 210/512.1; 210/512.2; 55/459.1; 55/459.3; 55/459.4; 209/715; 209/717; 209/720; 209/721; 209/723; 209/725; 209/728; 209/732; 209/733

(58) Field of Search ............................ 210/87, 97, 512.1, 210/512.2, 788; 55/459.1, 459.2, 459.3, 459.4; 209/715, 717, 720, 721, 723, 725, 726, 728, 732, 733

(56) References Cited

FOREIGN PATENT DOCUMENTS 40 09 680 A1 * 10/1990 (DE) .

* cited by examiner

*Primary Examiner*—David A. Reifsnyder
(74) *Attorney, Agent, or Firm*—Andrus, Sceales, Starke & Sawall

(57) ABSTRACT

A cyclonic separator for separating fluids of differing densities comprises a first chamber having a vortex finder and a core member. The vane is arranged co-axial with and adjacent the internal surface of the vortex finder to increase the rotational velocity component of fluids passing through the vortex finder by translating the axial velocity component of the fluids into a rotational velocity component.

16 Claims, 4 Drawing Sheets

FIG 3
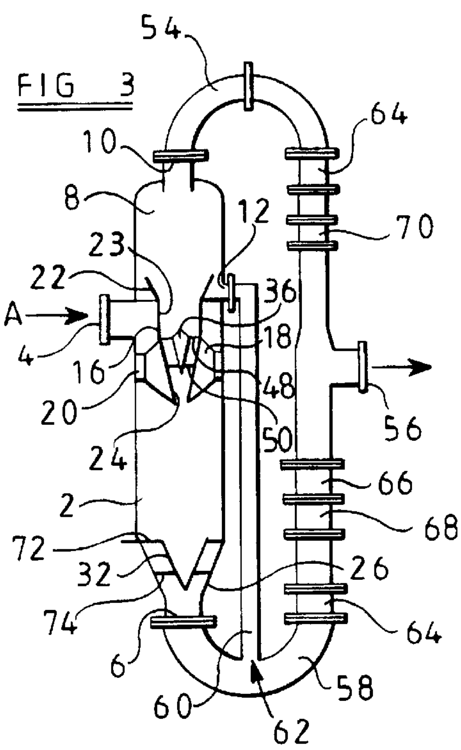
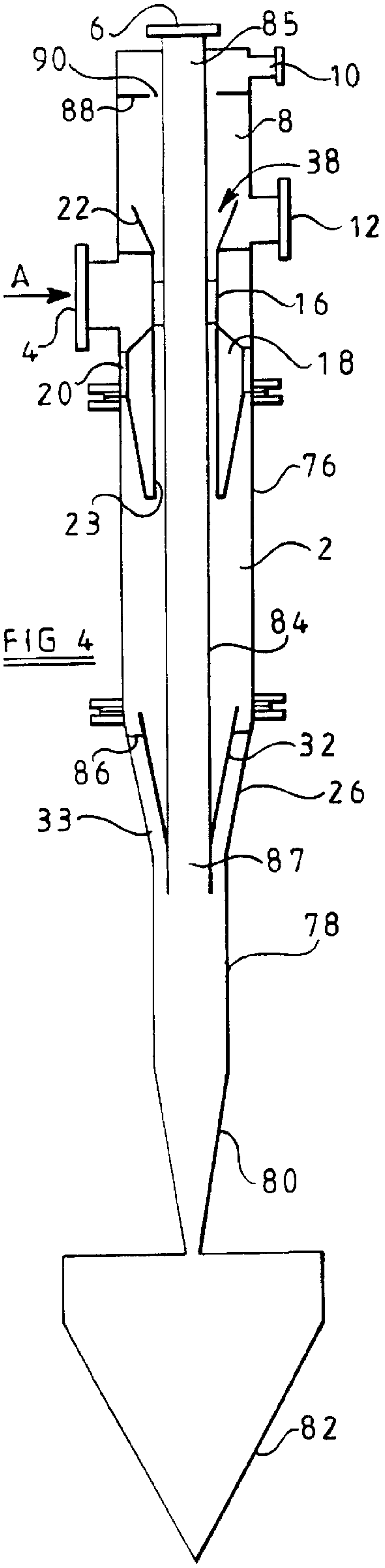
FIG 4
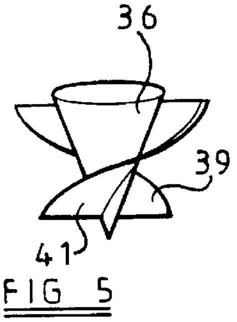
FIG 5

CYCLONIC SEPARATOR

The present invention relates to a cyclonic separator for separating fluids of differing densities, for example: gas and liquid, such as water and gas; liquid and liquid, such as oil and water; liquid, liquid and particles, such as oil, water and sand; or liquid, gas and particles, such as oil/water mixture, gas and sand, the latter two examples corresponding to three-phase separation. Cyclonic separators can be cylindrical or tapered in cross-section, and are typically, employed within the gas and oil processing industries for separating hydrocarbon fluids from produced water and sand.

A known type of cyclonic separator for separating gas from a liquid comprises a main chamber having a mixture inlet port, a first outlet port for light fluid and a second outlet port for heavy fluid. A second chamber is provided adjacent the first chamber and is in fluid communication therewith by means of a vortex finder. Gas separated from the liquid passes through the vortex finder to the second chamber, and any residual liquid which passes through the vortex finder with the gas is separated by the residual rotational velocity component of the residual gas/liquid mixture, before leaving the second chamber via a third outlet port.

However, the gas extracted by the separator still contains an unacceptably high proportion of liquid.

According to a first aspect of the present invention, there is provided a cyclonic separator for separating fluids of differing densities, comprising a first chamber having a vortex finder and means co-axial with and adjacent the internal surface of the vortex finder for increasing the rotational velocity component of fluids passing through the vortex finder by translating the axial velocity component of the fluids into a rotational velocity component.

Preferably, the increasing means is a core member defining an annular channel within the internal surface of the vortex finder. More preferably, the core member includes a vane.

The vortex finder may have a frusto-conical end portion. Alternatively, the vortex finder may have a tapered end portion.

The core member may be cylindrical in cross-section. Alternatively, the core member may be tapered. Preferably, the core member is tapered outwardly in the intended direction of flow of the fluids through the vortex finder.

A flow modifying means may be provided for increasing the flow of fluids through the vortex finder.

Preferably, the first chamber comprises an inlet substantially tangential to the longitudinal axis of the first chamber. More preferably, the first chamber has a liquid output port.

A second chamber may be provided having a liquid carry-over port and a gas output port. The gas output port may be operably connected to the liquid output port by a first conduit. The first conduit may have a mixture output port located between the liquid output port and the gas output port.

Preferably, the liquid carry-over port is operably connected to the first conduit by a second conduit at substantially the lowest point between the liquid output port and the mixture Output port.

Preferably, the pressure differential between the gas output port and the mixture output port does not exceed the pressure differential between the liquid output port and the mixture output port.

According to a second aspect of the present invention, there is provided a cyclone separator comprising the cyclonic separator according to the first aspect of the present invention.

According to a third aspect of the present invention, there is provided a metering system including the cyclonic separator according to the first aspect of the present invention.

According to a fourth aspect of the present invention, there is provided a de-sander including the cyclonic separator according to the first aspect of the present invention.

The invention will now be described in greater detail, by way of example, with reference to the accompanying drawings, in which:

FIG. 3 is a cross-sectional view of a metering system constituting a further embodiment of the present invention;

FIG. 4 is a cross-sectional view of de-sander constituting another embodiment of the present invention;

FIG. 5 is a component shown in FIGS. 1 to 3 in greater detail;

Throughout the description, like reference numerals denote like parts.

Figure 1:
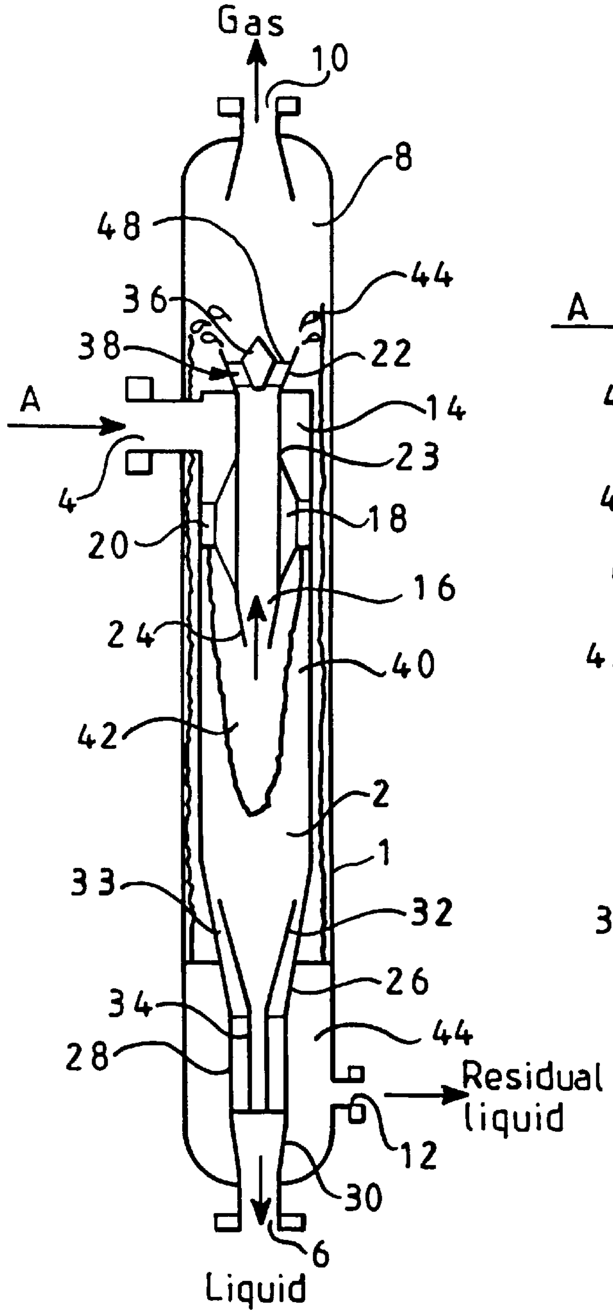
FIG. 1 is a cross-sectional view of a separator constituting an embodiment of the present invention.

Referring to FIG. 1, a separator vessel 1 includes a main gas/liquid separation chamber 2 having a mixture inlet port 4 and a liquid outlet port 6, and a second stage gas/liquid separation chamber or scrubber 8 having a gas outlet port 10 and a liquid drainage port 12. The main chamber 2 is located within the second chamber 8.

The main chamber 2 includes an inlet distribution chamber 14 in fluid communication with the inlet port 4. The main chamber 2 has a first tapered portion 26, welded to a cylindrical portion 28, which is connected to a second tapered portion 30 in fluid communication with the outlet port 6. A flow modifying device 32 integrally formed with stay rods or a vane portion 34 is coaxially located within the first tapered portion 26 and the cylindrical portion 28, respectively, and define an annular channel 33. Such a configuration is described in PCT Application No. NO95/00144.

A vortex finder 16 is coaxially located within the main chamber 2 and is held in place by supports 18 connected to first curved vanes 20. The vortex finder 16 has a frusto-conical first end portion 22 which tapers outwardly towards the gas outlet port 10, a tapered second end portion 24 which tapers inwardly towards the liquid outlet port 6, and a central cylindrical portion 23.

A tapered core member 36 (shown more clearly in FIG. 5) is coaxially located within the first end portion 22 by a first generally helical vane 39 so as to define an annular helical channel 38 therebetween. A second vane 41 can be located within the annular channel 38 (FIG. 5), and the core member 36 need not be tapered.

When in use, a hydrocarbon fluid mixture, for example, an oil/gas mixture, A, is introduced at high pressure through the inlet port 4 and gains a rotational velocity component as a result of passing over the first vanes 20. If the inlet port 4 is disposed tangentially to the main chamber 2, the mixture A gains a rotational velocity component upon entry into the main chamber 2 and so the first vanes 20 are not required. A vortex is therefore formed within the main chamber 2 by the mixture A, causing the constituents of the mixture A, in this case oil and gas, to separate, the higher density fluid, in this case oil 40, residing at the periphery of the vortex and the lower density fluid, in this case gas, residing at the core of the vortex. The majority of the oil 40 passes through the annular channel 33 and leaves the separator via the liquid outlet port 6.

Interaction between the vortex and the flow modifying device 32 generates a back pressure within the gas core 42, urging the gas and a residual quantity of oil to pass into the vortex finder 16. Due to the back pressure, the gas and any residual oil (hereinafter referred to as the "residual mixture") passes through the vortex finder 16 until the first or first and second vanes 39, 41 are reached. The passage of the residual mixture around the vane or vanes 39, 41 translates the majority of the axial velocity component of the residual mixture into a rotational velocity component, causing the oil component of the residual mixture (hereinafter referred to as "residual oil 44") to be projected radially outward due to centrifugal forces. The residual oil 44 passes down through the second chamber 8, along the inner wall of the vessel 1 and leaves the separator via the liquid drainage port 12, whilst the gas leaves the separator via the gas outlet port 10.

Figure 2:
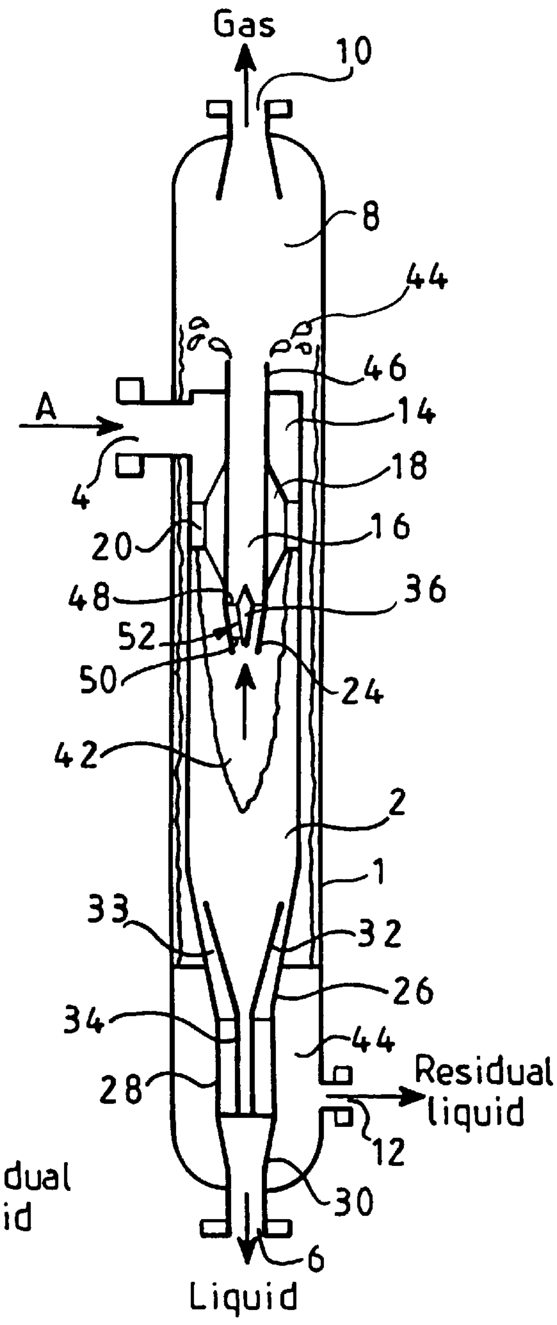
FIG. 2 is a cross-sectional view of a separator constituting another embodiment of the present invention.

The separator of FIG. 2 differs from that of FIG. 1, in that the vortex finder 16 possesses a tapered or cylindrical first end portion 46 instead of a frusto-conical one. The tapered core section 36 defining an annular channel 52 is coaxially fixed within the tapered second end portion 24 by upper and lower curved vanes 48, 50.

During normal operation (as described above), the residual mixture having a high axial velocity component enters the vortex finder 16. As the residual mixture passes through the annular channel 52, the axial velocity component of the residual mixture is translated into a rotational velocity component. The residual mixture continues to pass through the vortex finder 16 and enters the second chamber 8 via the cylindrical end portion 46. Due to the rotational velocity component acquired by the residual mixture, the individual constituents of the residual mixture, i.e. the oil and the gas, are separated. The gas and the residual oil leave the separator in the same way as described in relation to the separator of FIG. 1.

The multiphase metering system of FIG. 3 comprises a first chamber 2 having a mixture inlet port 4, a liquid outlet port 6 and a flow modifying device 32 coaxially fixed in a tapered lower portion 26 of the main chamber 2 by upper and lower supports 72, 74. A second chamber 8 is provided having a gas outlet port 10 and a liquid drainage port 12. The first and second chambers 2, 8 are located adjacent one another and are in fluid communication by means of a vortex finder 16 coaxially fixed within the first and second chambers 2, 8, by supports 18 connected to first vanes 20.

The vortex finder 16 comprises a frusto-conical first end portion 22 which tapers outwardly towards the gas outlet port 10, a tapered second end portion 24 and a central cylindrical portion 23. A core 36 is coaxially fixed within the second end portion 24 by upper and lower, or first and second, vanes 48, 50.

A first pipe 54 connects the gas outlet port 10 to a mixture outlet port 56. A second pipe 58 connects the liquid outlet port 6 to the mixture outlet port 56. A third pipe 60 connects the liquid drainage port 12 to a lowest point 62 of the second pipe 58.

A respective flow straightener 64 is located in each of the first and second pipes 54, 58. An oil-water fraction meter 66 and a liquid volumetric flow meter 68 are located in the second pipe 58. A gas volumetric flow meter 70 is located in the first pipe 54. Although the first and second pipes 54, 58 have been described as single continuous conduits, the first and second pipes can comprise a plurality of portions, a number of which can contain a meter located respectively therein.

In use, the multiphase metering system functions in a similar manner to the separators of FIGS. 1 and 2 to the extent that the residual mixture is separated upon leaving the vortex finder 16 due to the rotational velocity component acquired from the passage of the residual mixture over the vane or vanes 48, 50. The residual oil (not shown) passes through the third pipe 60 to join the oil leaving the main chamber 2 through the second pipe 58. The volumetric flow rate of the oil and the oil/water fraction are measured as the oil passes through the second pipe 58 by the meters 66, 68. Similarly, the volumetric flow rate of the gas is measured as the gas passes through the first pipe 54 by the meter 70. The oil and gas then recombine where the first and second pipes 54, 58 meet and leave the metering system via the mixture outlet port 56.

Referring to FIG. 4, a de-sander comprises a main chamber 2 having a mixture inlet port 4, a first cylindrical portion 76, a first tapered portion 26, a second cylindrical portion 78 and a second tapered portion 80 in fluid communication with a sand collection chamber 82.

A vortex finder 16 is coaxially fixed by supports 18 connected to first vanes 20 with the main chamber 2 and has a frusto-conical first end portion 22 and a cylindrical portion 23. Alternatively, the first end portion need not be frusto-conical in shape. An annular channel 38 is defined between a co-axial longitudinal cylinder 84 and the end portion 22 of the vortex finder 16. The cylinder 84 communicates between the main chamber 2 and a second chamber 8 adjacent the main chamber 2, the cylinder 84 having a first end 85 defining a liquid outlet port 6 and a second end 87 integrally formed with a flow modifying device 32 located coaxially within the first tapered portion 26 and defining an annular channel 33. The flow modifying device 32 is fixed to the first tapered portion 26 by supports 86.

The second chamber 8 comprises a gas outlet port 10, a liquid drainage port 12 and a partition wall 88 having an aperture 90 to permit the passage of the cylinder 84 therethrough whilst keeping the residual liquid away from the gas outlet port 10.

In use, a mixture, A, for example oil, gas and sand, entering the main chamber 2 passes over the first vanes 20 to form a mixture vortex. The denser components of the mixture A, in this case oil and sand, reside at the periphery of the vortex and pass through the annular channel 33. Due to gravity, the sand passes through the main chamber 2 to the sand collection chamber 82. The remaining oil residing at the periphery of the vortex, and possessing a rotational velocity component, interacts with the second tapered portion 80, translating the rotational velocity component of the remaining oil into an axial velocity component and, due to the presence of a back pressure, passes through the cylinder 84 and leaves the de-sander via the liquid outlet port 6.

The gas core 42 and any residual oil surrounding the cylinder 84 interacts with the flow modifying device 32, translating the rotational velocity component of the residual mixture into the axial velocity component. The residual mixture is urged towards the vortex finder 16 by a back pressure and passes therethrough. Interaction of the residual mixture with the cylinder 84 and the first end portion 22 during passage through the annular channel 38, translates the axial velocity component of the residual mixture into the rotational velocity component as described above in relation to FIGS. 1 to 3.

The residual oil component is consequently separated from the gas component and leaves the second chamber 8 via the residual liquid outlet port 12, whilst the gas component leaves the second chamber 8 via the gas outlet port 10.

The second chamber 8 described in the above examples can additionally be provided with an array of axial cyclones to further separate any remaining liquid from the gas.

Although the above examples have been described in the context of separating oil/gas mixtures and oil/gas/sand mixtures, the present invention can be used to separate other mixtures, for example, powder and water, oil and water, sand and oil, or sand and water. It is not intended that the term "fluid" be limited to gases and liquids but that instead it be construed as including particulate solids and particulate solids suspended in fluids.

Figure 6:
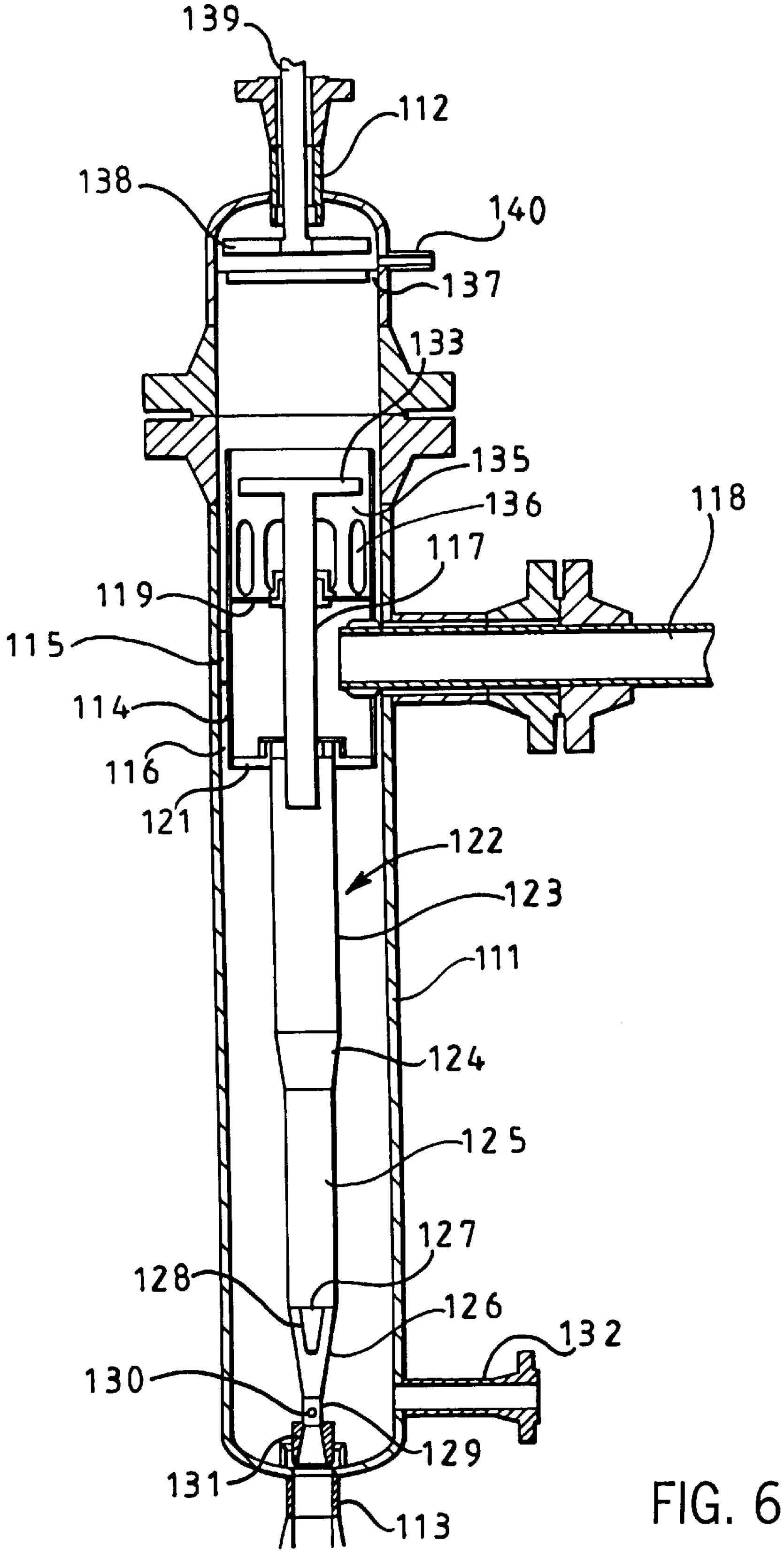
FIG. 6 is a cross-sectional view of a gas/liquid hydrocyclone.
Figure 7:
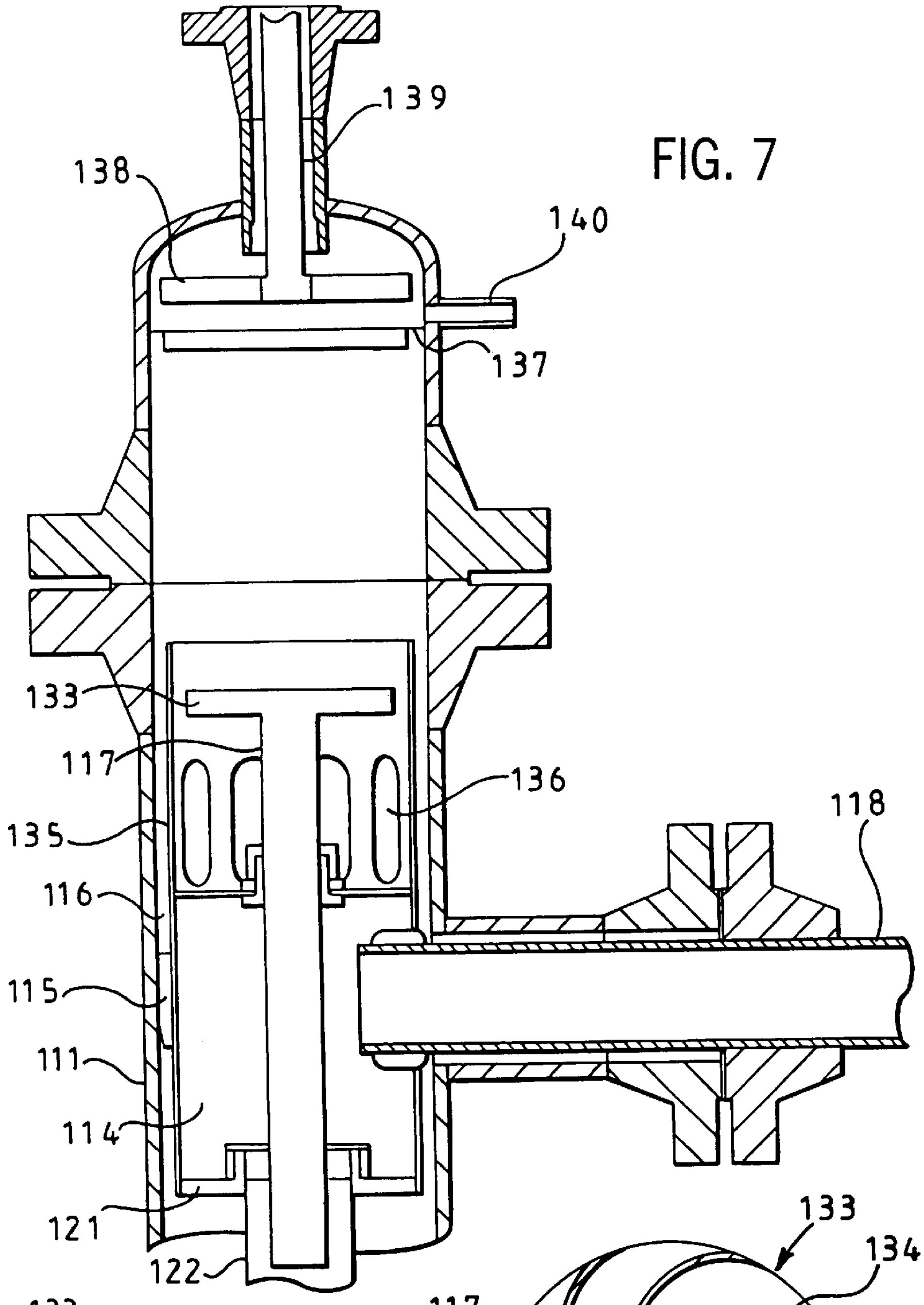
FIG. 7 is an enlargement of part of FIG. 6.

FIG. 6 illustrates a further example of the present invention, the device of FIG. 6 being a cyclone separator for separating the gas and liquid phases of an oil well flow. The device is normally referred to as a hydrocyclone, and it is assumed that there is no necessity to separate sand, and that the liquid phases, that is to say the oil and water phases of the wellhead flow are to be separated after removal of the gas.

The hydrocyclone of FIG. 6 comprises an elongate, external, cylindrical casing 111 having a gas outlet 112 at its upper end (as viewed in FIG. 6) and a liquid outlet 113 at its lower end, the outlet 113 being coaxial with the outlet 112. Supported within the casing 111 towards its upper end is a cylindrical inlet housing 114. The housing 114 is coaxial with the casing 111 and the cylindrical wall of the housing 114 is carried by the interior of the casing 111 through the intermediary of circumferentially spaced supports 115. Thus an annular passage 116 is defined between the outer surface of the housing 114 and the inner surface of the casing 111, the supports 115 constituting only a very minor obstruction in the passage 116. A cylindrical tube 117 extends coaxially through the housing 114 defining a vortex finder as will be described in more detail hereinafter. An inlet pipe 118 extends through the wall of the casing 111 and into the housing 114. Wellhead flow, after being throttled to an appropriate pressure, enters the housing 114 through the pipe 118.

The axially upper end of the housing 114 is closed by a top wall 119 and extending downwardly from a bottom wall 121 of the housing 114 is a cyclone tube 122 of known form. The tube is coaxial with the casing 111 and includes a first cylindrical section 123 followed by a first taper section 124, followed in turn by a second, smaller diameter, cylindrical section 125 then followed by a second tapering section 126. A flow modifying, or gas blockage device 127 as disclosed in PCT Application No. NO95/00144 is disposed coaxially within the second tapering section 126 and is supported therein by three equiangular spaced fins 128 which constitute an insignificant restriction in the flow path defined by the annular passage between the device 127 and the inner wall of the section 126.

At the end of the section 126 there is a short cylindrical section 129 having a plurality of apertures 130 in its wall, the short cylindrical section 129 opening into a divergent nozzle section 131 aligned with the outlet 113. An annular passage around the nozzle 131 places the outlet 113 in communication with the interior of the casing 111 around the cyclone tube 122.

The vortex finder tube 117 extends downwardly through the lower wall 121 of the housing 114 and into the upper end of the cylindrical section 123 of the tube 122. The lower wall 121 of the housing 114 is not a simple plane wall. In fact it is a double skin wall the two skins being separated by a plurality of approximately spirally curving vanes which, at their radially innermost ends, open into the upper end of the cylindrical section 123 of the tube 122. The vanes, or more accurately the curved passages defined between the vanes in the wall 121 define inlet passages by way of which the wellhead flow entering the housing 114 passes into the cyclone tube 122. The curving passages provide the flow entering the upper end of the tube 122 with a circulating moment such that a cyclone circulation is set up within the tube 122.

The circulation of the liquid/gas mixture within the upper end region of the tube 122 promotes separation of the gas which forms as a gas core within an annular layer of liquid rotating adjacent the wall of the tube 122. Separation takes place as the circulating liquid migrates towards the lower end of the tube 122 in known manner, the device 127 causing the generation of a back-pressure within the gas core driving the gas upwardly through the vortex finder tube 117. At the lower end of the tube 122 the liquid, from which gas has been removed, flows through the short cylindrical region 129 to the outlet 113. Any liquid which collects in the lower end of the casing 111 (as will be described hereinafter) will either flow from the secondary liquid outlet 132 or will be drawn through the apertures 130 into the short cylindrical region 129 by the vortex action occurring in the liquid as it passes through the restriction constituted by the portion 129.

Figure 8:
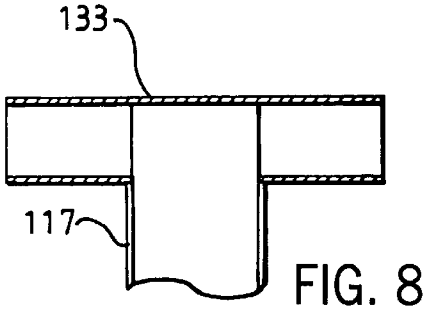
FIGS. 8 and 9 are sectional views of part of the hydrocyclone of FIG. 6.
Figure 9:
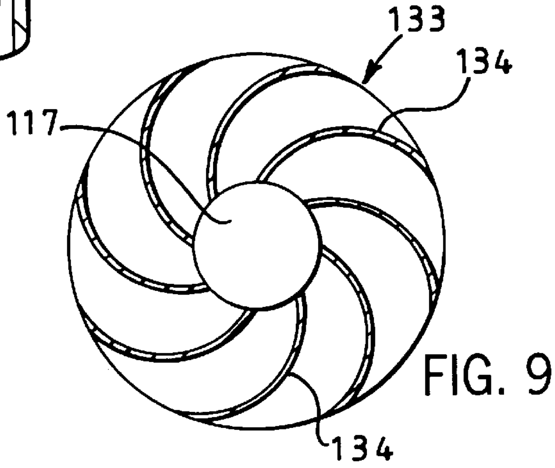

The gas core entering the vortex finder 117 has a rotational velocity, but also has a significant axial velocity. Liquid droplets are carried with the gas flow, and in order to remove the liquid droplets from the gas flow, before the gas exits by way of the gas outlet 112, there is provided a swirl device at the upper end of the vortex finder 117. The swirl device 133 is shown in more detail in FIGS. 8 and 9 and comprises a cylindrical chamber divided internally into a plurality of approximately spirally extending passages by means of a plurality of correspondingly spirally extending vanes 134. It will be recognised therefore that the gas flow entering the chamber 133 from the vortex finder 117 has its flow direction, and thus its axial velocity, converted by the vanes 134 into a rotational velocity such that liquid droplets entrained in the gas flow impinge on the vanes 134 and coalesce in droplets which migrate along the vanes to their outer free edges. The gas flow thus drives the coalescing droplets from the outer peripheral edge of the chamber 133 and they impact upon the interior of a cylindrical shroud 135 disposed around the chamber 133. The shroud 135 is spaced from the inner wall of the casing 111 in the same manner as the housing 114 such that there is an annular passage surrounding the shroud.

Liquid droplets collected on the interior of the shroud flow downwardly under gravity and enter the annular passage 116 either through apertures 136 in the wall of the shroud or by way of a gap between the lower end of the shroud and the wail 119 of the housing 114. Gas exiting from the chamber 133 flows upwardly towards the outlet 112, and as the gas still has a rotational velocity further liquid entrained with the gas will migrate to the wall of the chamber 111 to coalesce thereon and run down through the annular clearance between the shroud 135 and the outer casing, the annular passage 116, to collect in the lower end of the casing 111.

Adjacent its upper end the casing 111 has a pressure take off 140 for monitoring purposes. An annular member 137 defines a lip extending radially inwardly and axially downwards from the inner wall of the casing 111 to trap any further liquid droplets coalescing on the wall of the casing. The gas flow passes through the central aperture of the lip 137 and into a flow straighter 138 which is in effect the inverse of the chamber 133. The flow straightener 138 contains curved vanes which accept the circulating flow of gas, and convert it into an axial flow in an outlet tube 139 lying within the outlet 112.

It will be recognised that a swirl chamber 133 similar to that described above could be used in the examples described above with reference to FIGS. 1 to 4 where appropriate. Moreover, the hydrocyclone described above with reference to FIGS. 6 to 9 could be used in a multiphase metering system of the kind shown in FIG. 3, or could form the basis of a de-sander of the kind illustrated in FIG. 4.

It will be recognised that in all of the alternative arrangements described above although it is preferred to use curved vanes there may be situations in which planar vanes could be utilized. Thus in an appropriate arrangement a planar vane may act as a deflection surface for the gas flow, in the same manner as the curved vanes described above, to deflect the flow and thus convert axial velocity into a lateral or rotational velocity whereby entrained liquid droplets and vapour condense and coalesce for collection and return to the liquid outlet.

What is claimed is:

1. A cyclonic separator for separating fluids of differing densities from a mixture thereof, comprising, a vessel, a first stage cyclone separator housed within said vessel and including a first separation chamber having an inlet for the mixture to be separated, an underflow outlet for a more dense fluid phase separated from said mixture, and an overflow outlet for a less dense fluid phase separated from said mixture, an inlet conduit communicating with said inlet of said first stage cyclone separator for conducting said mixture through the wall of said vessel to said inlet, an outlet conduit communicating with said underflow outlet of said first stage cyclone separator for conducting said more dense fluid phase from said outlet through the wall of said vessel, and, said overflow outlet of said first stage cyclone separator in use discharging said less dense fluid phase into said vessel, and including a vortex finder and means for deflecting the flow which issues from the vortex finder to promote separation therefrom of any entrained more dense fluid phase, whereby said overflow outlet and said vessel define a second stage cyclone separator, separated more dense fluid phase of the overflow mixture from the first stage being collected in said vessel.

2. A separator as claimed in claim 1, wherein said deflecting means is co-axial with and adjacent the internal surface of the vortex finder and serves to increase the rotational velocity component of fluids passing through the vortex finder by translating an axial velocity component of the fluids into a rotational velocity component.

3. A separator as claimed in claim 2, wherein the increasing means is a core member defining an annular channel within the vortex finder and a vane within said channel for deflecting of the fluid flow.

4. A separator as claimed in claim 1, further comprising a flow modifying means in said first chamber for increasing the flow of fluids through the vortex finder.

5. A separator as claimed in claim 1, wherein said first chamber inlet is substantially tangential to a longitudinal axis of the first chamber.

6. A separator as claimed in claim 1, wherein said deflecting means comprises a plurality of curved vanes.

7. A separator as claimed in claim 6, wherein said vanes curve outwardly from the axis of the vortex finder.

8. A separator as claimed in claim 7, wherein said vanes are generally spiral in nature.

9. A separator as claimed in claim 1, wherein the separated more dense phase collected in said vessel is recombined with the underflow from the first stage separator.

10. A separator as claimed in claim 9, wherein said outlet conduit, within said vessel, has an aperture whereby said dense phase collected in the vessel flows into said conduit to combine with said underflow.

11. A separator as claimed in claim 1, wherein the vessel has an outlet for the less dense phase which has undergone first and second stage separation.

12. A separator as claimed in claim 11, wherein there is provided a flow straightener with which the flow of less dense phase coacts to dissipate any remaining swirling motion of the flow prior to exiting through said less dense phase outlet.

13. A separator as claimed in claim 11, wherein there is provided a circumferential lip on the wall of said vessel adjacent said less dense phase outlet to obstruct the tendency for more dense phase which has collected on the vessel wall being driven to said less dense phase outlet by the flow of less dense phase.

14. A multiphase metering device comprising a vessel, a first stage cyclone separator within said vessel including a first separation chamber having an inlet for mixture of fluids of differing densities to be separated, an underflow outlet for a more dense fluid phase separated from said mixture, and an overflow outlet for a less dense fluid phase separated from said mixture, said overflow outlet of said first cyclone separator discharging said less dense fluid phase in use into a second chamber within said vessel, and including a vortex finder and means for deflecting the flow which issues from the vortex finder to promote separation therefrom of any entrained more dense phase, whereby said overflow outlet and said second chamber define a second stage cyclone separator, said second chamber having a less dense fluid phase outlet, and the device including first means for measuring the less dense fluid phase issuing from said less dense fluid phase outlet and second means for measuring the total of the more dense fluid phase leaving the underflow outlet of the first chamber and the more dense fluid phase collected in the second chamber.

15. A multiphase metering device as claimed in claim 14, including means for recombining the more and less dense fluid phases after measurement.

16. A cyclonic separator for separating the phases of a three phase mixture of components of differing densities including a more dense phase, an intermediate density phase and a less dense phase, comprising a vessel having a common outer wall enclosing a first stage cyclone separator including a first separation chamber having an inlet for the mixture to be separated, an underflow outlet for a second mixture of the more dense phase and the intermediate density phase separated from said three phase mixture, and an overflow outlet for the less dense phase separated from said three phase mixture, said overflow outlet of said first cyclone separator discharging said less dense phase into a second chamber, and including a vortex finder and means for deflecting the flow which issues from the vortex finder to promote separation therefrom of any entrained more dense phase, whereby said overflow outlet and said second chamber define a second stage cyclone separator, said second chamber having a less dense phase outlet, said first stage underflow passing to a further separation stage where the more dense phase separates from the intermediate density phase and is collected under gravity, the intermediate density phase flowing through an intermediate density phase outlet.

* * * * *